(12) United States Patent
Tesar

(10) Patent No.: US 11,241,746 B2
(45) Date of Patent: Feb. 8, 2022

(54) TRANSMISSION FOR SHOP TOOL BASED ON STAR COMPOUND GEAR TRAIN

(71) Applicant: Delbert Tesar, Austin, TX (US)

(72) Inventor: Delbert Tesar, Austin, TX (US)

(*) Notice: Subject to any disclaimer, the term of this patent is extended or adjusted under 35 U.S.C. 154(b) by 0 days.

(21) Appl. No.: 16/374,749

(22) Filed: Apr. 3, 2019

(65) Prior Publication Data

US 2019/0301571 A1 Oct. 3, 2019

Related U.S. Application Data

(60) Provisional application No. 62/651,737, filed on Apr. 3, 2018.

(51) Int. Cl.
*B23B 45/00* (2006.01)
*B25F 5/00* (2006.01)

(52) U.S. Cl.
CPC .......... *B23B 45/008* (2013.01); *B25F 5/001* (2013.01); *B23B 2260/11* (2013.01); *F16H 2200/0043* (2013.01)

(58) Field of Classification Search
CPC ... B23B 45/008; B23B 2260/11; B25F 5/001; F16H 2200/0043; F16H 2200/2064; F16H 2200/2094; F16H 35/10; F16H 2200/2012; F16H 3/66
USPC ..................................... 173/40–41, 140, 216
See application file for complete search history.

(56) References Cited

U.S. PATENT DOCUMENTS

| | | | | |
|---|---|---|---|---|
| 3,802,795 A * | 4/1974 | Nyeste | ............... | F04D 25/028 415/122.1 |
| 4,759,229 A * | 7/1988 | Takahashi | ............. | F16H 57/082 74/409 |
| 6,913,429 B1 * | 7/2005 | Phillips | ................ | B23B 31/201 144/136.95 |
| 2004/0211576 A1 * | 10/2004 | Milbourne | ............. | B25F 5/006 173/48 |
| 2005/0061524 A1 * | 3/2005 | Hagan | ...................... | B25F 5/02 173/217 |
| 2009/0277658 A1 * | 11/2009 | Chen | ....................... | B25F 5/001 173/183 |
| 2010/0163261 A1 * | 7/2010 | Tomayko | ................ | B25F 5/001 173/47 |
| 2011/0152029 A1 * | 6/2011 | Rudolph | ................ | B25F 5/001 475/271 |
| 2013/0220655 A1 * | 8/2013 | Tomayko | ................ | B25B 23/14 173/47 |
| 2013/0237367 A1 * | 9/2013 | Roehm | .................... | F16H 3/44 475/290 |
| 2014/0182419 A1 * | 7/2014 | Hsu | ....................... | B25B 21/00 81/57.11 |
| 2015/0367493 A1 * | 12/2015 | Pedersen | ................ | B25F 5/001 173/216 |
| 2017/0355072 A1 * | 12/2017 | Mao | ....................... | B25F 5/001 |
| 2019/0134718 A1 * | 5/2019 | Stafflage | .............. | B23B 45/008 |

(Continued)

*Primary Examiner* — Nathaniel C Chukwurah
(74) *Attorney, Agent, or Firm* — John A. Fortkort; Fortkort & Houston PC

(57) ABSTRACT

A power tool is provided which includes a housing assembly; a motor assembly disposed in the housing assembly and having an output shaft; a trigger assembly coupled to the housing assembly and configured for use in actuating the motor assembly; a spindle; and a transmission assembly transmitting rotary power between the motor assembly and the spindle. The transmission assembly comprises a star compound gear train.

20 Claims, 9 Drawing Sheets

(56) References Cited

U.S. PATENT DOCUMENTS

2019/0301571 A1* 10/2019 Tesar ..................... B25F 5/001
2020/0353609 A1* 11/2020 Huggenberger .......... F16H 3/64

* cited by examiner

-- Prior Art --

-- Prior Art --

-- Prior Art --

US 11,241,746 B2

TRANSMISSION FOR SHOP TOOL BASED ON STAR COMPOUND GEAR TRAIN

CROSS-REFERENCE TO RELATED APPLICATIONS

This application claims the benefit of priority of U.S. provisional application No. 62/651,737, filed Apr. 3, 2018, having the same inventor and the same title, and which is incorporated herein by reference in its entirety.

FIELD OF THE DISCLOSURE

The present disclosure relates generally to mechanical actuators and devices incorporating the same, and more particularly to a transmission for shop tools based on a star compound gear train.

BACKGROUND OF THE DISCLOSURE

Various transmissions have been developed in the art for drills and other power tools. Many of these have been described in the patent literature. These include, for example, the transmissions described in U.S. 2011/0127059 (Limberg et al.), entitled "Precision Torque Tool", EP2666595 (Beadman et al.), entitled Planetary gear Assembly With Protection Clutch", U.S. Pat. No. 6,070,675 (Mayer et al.), entitled "Gear Shiftable Planetary Transmission", U.S. Pat. No. 7,644,783 (Roberts et al.), entitled "Power Tool Gear-Train And Torque Overload Clutch Therefor", U.S. Pat. No. 9,233,461 (Tomayko), entitled "Tool Having Multi-Speed Compound Planetary Transmission", U.S. 2004/0211576 (Milbourne et al.), entitled Multispeed power Tool Transmission", U.S. 2009/0233754 (Pedersen), entitled planet Gear", U.S. 2012/0186842 (Wiedmann et al.), entitled "Drill Hammer And/Or Chipping Hammer Device", U.S. Pat. No. 7,021,399 (Driessen), entitled "Power Tool", U.S. 2009/0021090 (Du et al.), entitled "Power Tools With Motor Having A Multi-Piece Stator", and U.S. 2009/0101379 (Du et al.), entitled "Cordless Power Tool Having Multi-Speed Transmission And Constant Speed Light Torque Range".

Some transmissions for power tools have also been described in the academic literature. These include, for example, the transmissions described in the Honors Thesis by Kedrowski et al., entitled "Wobbling Gear Drivetrain For Cordless Screwdriver" (Western Michigan University, 1993).

Power tools have reached a high level of sophistication. The devices disclosed in U.S. Pat. No. 9,233,461 (Tomayko) (reproduced herein in FIG. 1) and U.S. 2011/0127059 (Limberg et al.) (reproduced herein as FIG. 2) are representative of the current state of the art. These devices feature transmissions that offer four speeds using a high-speed electric motor that drives a series of compact epicyclic gear trains arranged in series.

SUMMARY OF THE DISCLOSURE

In one aspect, a power tool is provided which comprises a housing assembly; a motor assembly disposed in the housing assembly and having an output shaft; a trigger assembly coupled to the housing assembly and configured for use in actuating the motor assembly; a spindle; and a transmission assembly transmitting rotary power between the motor assembly and the spindle, the transmission assembly comprising a star compound gear train.

DETAILED DESCRIPTION

Transmissions for power tools have become more functionally dense over the past decade. In particular, the Bosch 2-speed transmission described in EP2666595 (Beadman et al.), the Milwaukee 3-speed transmission described in U.S. 2011/0127059 (Limberg et al.) (reproduced herein as FIG. 2), and the Black and Decker 4-speed transmission described in U.S. 9,233,461 (Tomayko) (reproduced herein as FIG. 1) all excel in offering the user a set of speed/torque values to match a spectrum of physical tasks. These tasks range from rapid drilling/polishing/grinding, to relatively slow, high-torque tasks for screw driving/bolt tightening/ bolt hole tapping.

The Bosch transmission uses two epicyclic gear trains in series, and the Milwaukee transmission uses three epicyclic gear trains in series. The Black and Decker transmission uses four epicyclic gear trains in series (with compound planet gears) in a very compact arrangement. In the Black and Decker transmission, ring gears meshing with the planets can either free-wheel or be locked down by a finger slide latch adjustment. Each epicyclic gear train repeats the same gear proportions to result in three equal shift ratios with useful speed ranges.

Figure 8:
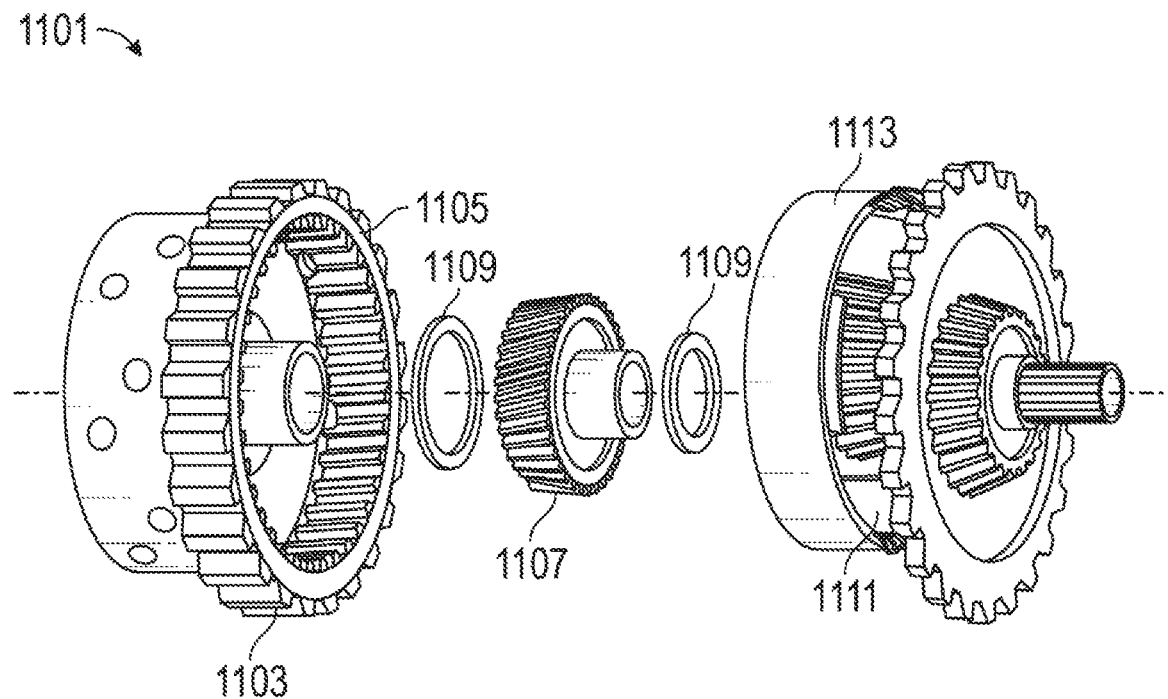
FIG. 8 is an illustration of a prior art epicyclic gear train.

A conventional epicyclic gear train 1101 is shown in FIG. 8. As seen therein, the particular epicyclic gear train depicted comprises a shell 1103 equipped with a ring gear 1205, an input sun gear 1107 equipped with thrust bearings 1109, and planets 1111 disposed in a cage 1113.

Unfortunately, despite their widespread use, epicyclic gear trains have many shortcomings, and these shortcomings are manifested as performance limitations in the foregoing devices. In particular, epicyclic gear trains utilize a cage that is always in rotation. The cage contains the end plates and all the planet gears (in the Black and Decker arrangement, the cage also drives all the free-wheel ring gears). Consequently, the rotating inertia of this design is very significant when the motor operates at higher speeds with low reduction ratios (higher output speeds). This inertia is attributable to the rotating cage mass, the translating mass of all the planets, and the rotating mass of all the planets.

Furthermore, at lower speeds and higher torques, the gear teeth contact loads and the bearing loads become quite high. At higher cage speeds, each planet gear experiences high radial centrifugal forces to cause wear on the fragile small needle bearings typically used in these devices.

Finally, the central shaft to the chuck on the Bosch and Black and Decker tools is relatively long, and provides a challenging arrangement to work. In particular, power must be taken from the central shaft, moved through a spring friction safety clutch, and returned to the central shaft to drive the chuck. This arrangement results in several drawbacks including, for example, undue complexity, extra length, and extra weight. Furthermore, this arrangement is not useful to resist the type of out-of-plane loads that frequently occur during drilling operations, and also limits the range of forces on other special tools that might be utilized.

It has now been found that the star compound gear train (described in detail herein) may be utilized as a unique, geared reducer technology to provide an alternative to the ubiquitous (and in some aspects, performance-limited) epicyclic gear train commonly utilized in drills and other shop tools. The star compound gear train may be critiqued based on ten performance criteria. Moreover, a nano dog-leg clutch may be utilized to produce transmissions based on the star compound gear train which may be configured as 2-speed or 4-speed devices with a free choice of gear ratios to provide a useful set of output speeds relative to a maximum prime mover input speed.

Figure 3:
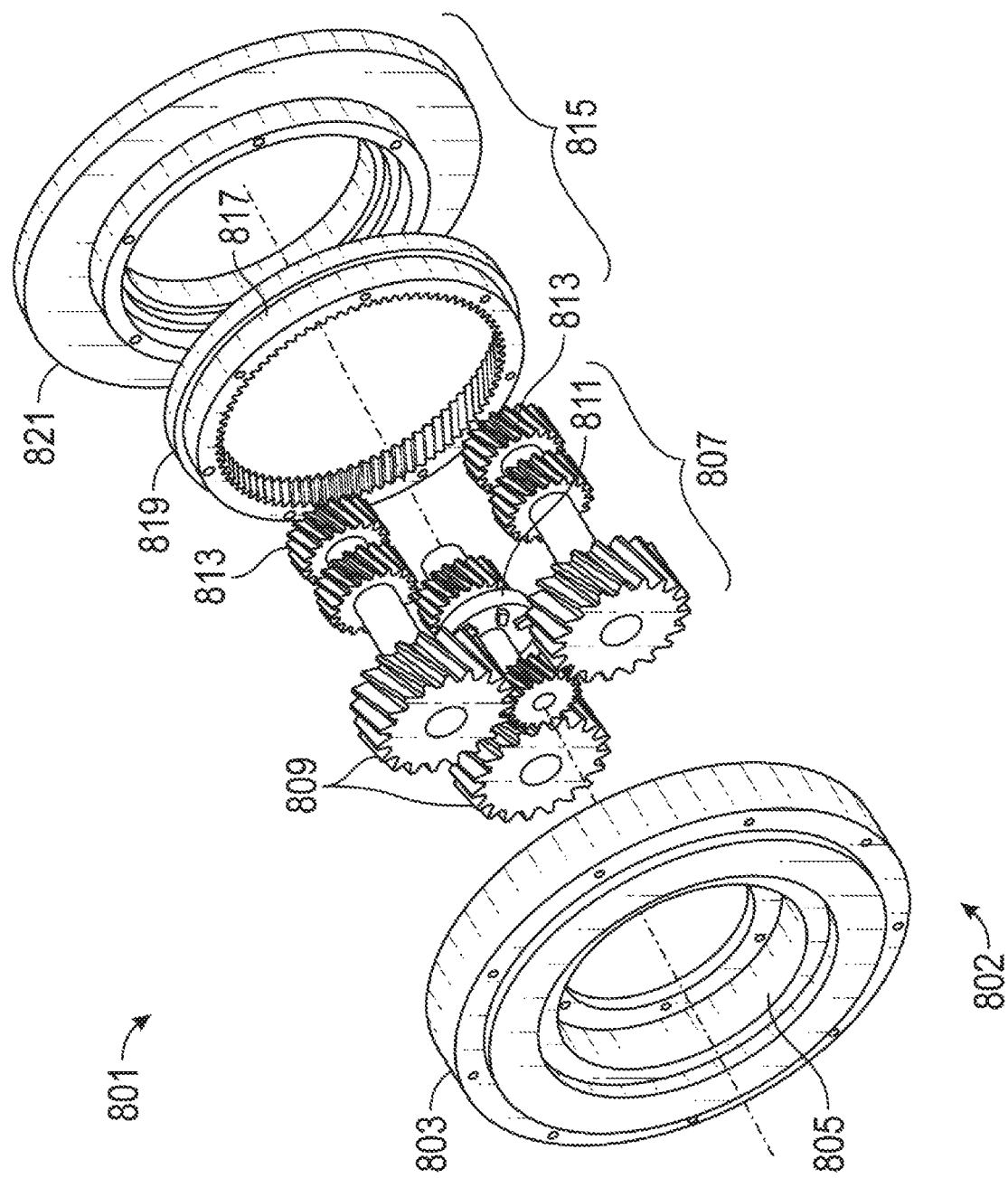
FIG. 3 is an exploded view of a 2-speed transmission for an electric power tool in accordance with the teachings herein.
Figure 4:
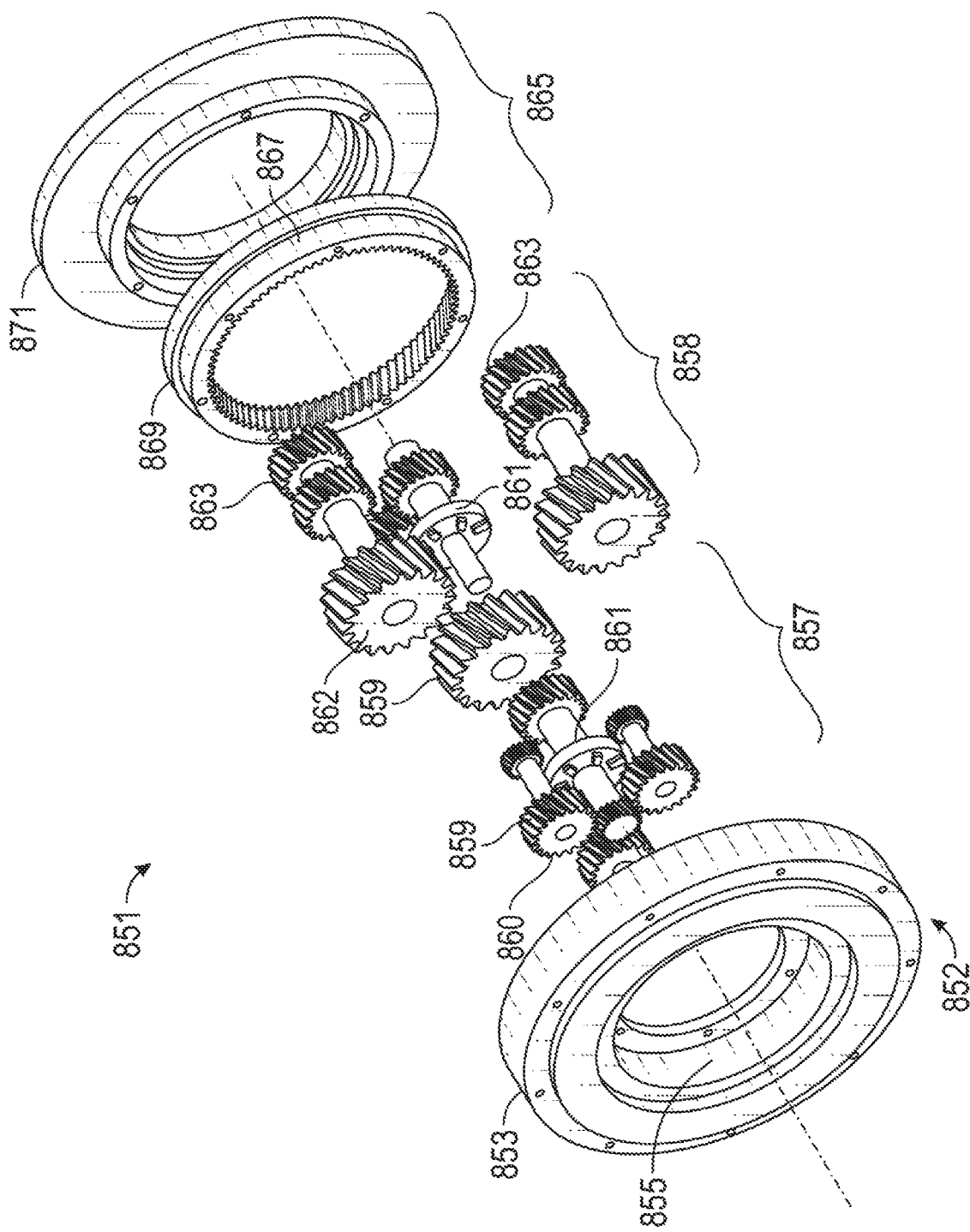
FIG. 4 is an exploded view of a 4-speed transmission for an electric power tool in accordance with the teachings herein.
Figure 5:
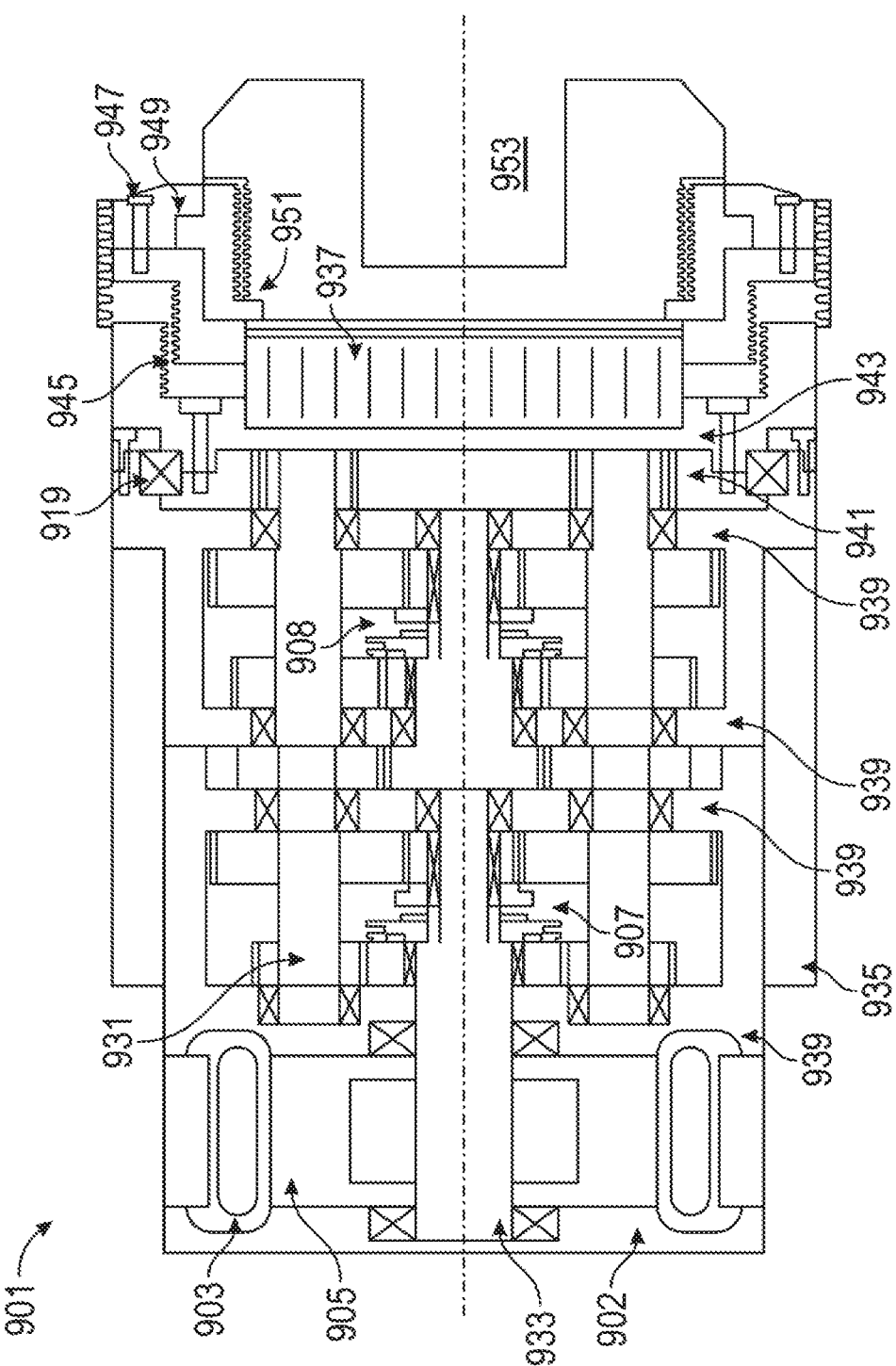
FIG. 5 is a schematic illustration of a 4-speed transmission for a power tool in accordance with the teachings herein.
Figure 6:
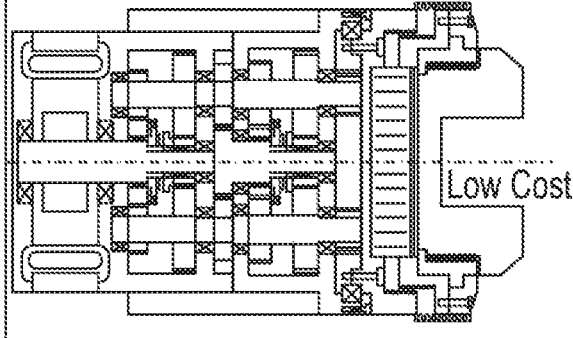
FIG. 6 is a tabulation of considerations for the development of low complexity multi-stage transmissions.

The systems and devices disclosed herein may be further understood with respect to the particular, non-limiting embodiments illustrated in FIGS. 3-5. FIG. 3 is an exploded view (without shell and strong back walls) of a particular, non-limiting embodiment of a 2-speed transmission 801 in accordance with the teachings herein which is based on a star compound gear train. FIG. 4 is an exploded view (without shell and strong back walls) of a particular, non-limiting embodiment of a 4-speed transmission 851 based on a star compound gear train in accordance with the teachings herein. FIG. 5 is a relatively complete cross-section of a 4-speed transmission 901 of the type depicted in FIG. 4.

With reference to FIG. 3, the particular, non-limiting embodiment of the 2-speed transmission 801 depicted therein comprises a prime mover 802; a stator 803; a rotor 805; a clutched star compound gear 807 comprising three concentric star gears 809, clutches 811 and output star gears 813; and a tool interface 815 comprising an output gear 817, a principal bearing 819, and a slip clutch 821.

FIG. 4 depicts a particular, non-limiting embodiment of a 4-speed transmission which is similar in many respects to the 2-speed transmission of FIG. 3. With reference thereto, the 4-speed transmission 851 depicted therein comprises a prime mover 852; a stator 853; a rotor 855; a front end clutched star compound gear 857 comprising three concentric star gears 860 and clutches 861; a back end clutched star compound gear 858 comprising three concentric star gears 862, clutches 861 and output star gears 863; and a tool interface 865 comprising an output gear 867, a principal bearing 869, and a slip clutch 871.

FIG. 5 is a relatively complete cross-section of a portion of a particular, non-limiting embodiment of a power tool (a drill) equipped with a 4-speed transmission 901 of the type depicted in FIG. 4. With reference to FIG. 5, the power tool 901 depicted therein comprises a motor 902, a stator 903, a rotor 905, a first star compound gear 907, a second star compound gear 908, a principal bearing 919, an M3 star shaft 931, a central shaft 933, a speed finger adjustment cylinder 935, a slip spring 937, four strong back walls 939, an internal gear 941, a cover plate 943, a spring adjustment thread 945, an assembly bracket 947, a slip collar 949, a chuck thread 951, and a drill bit chuck 953.

Figure 7:
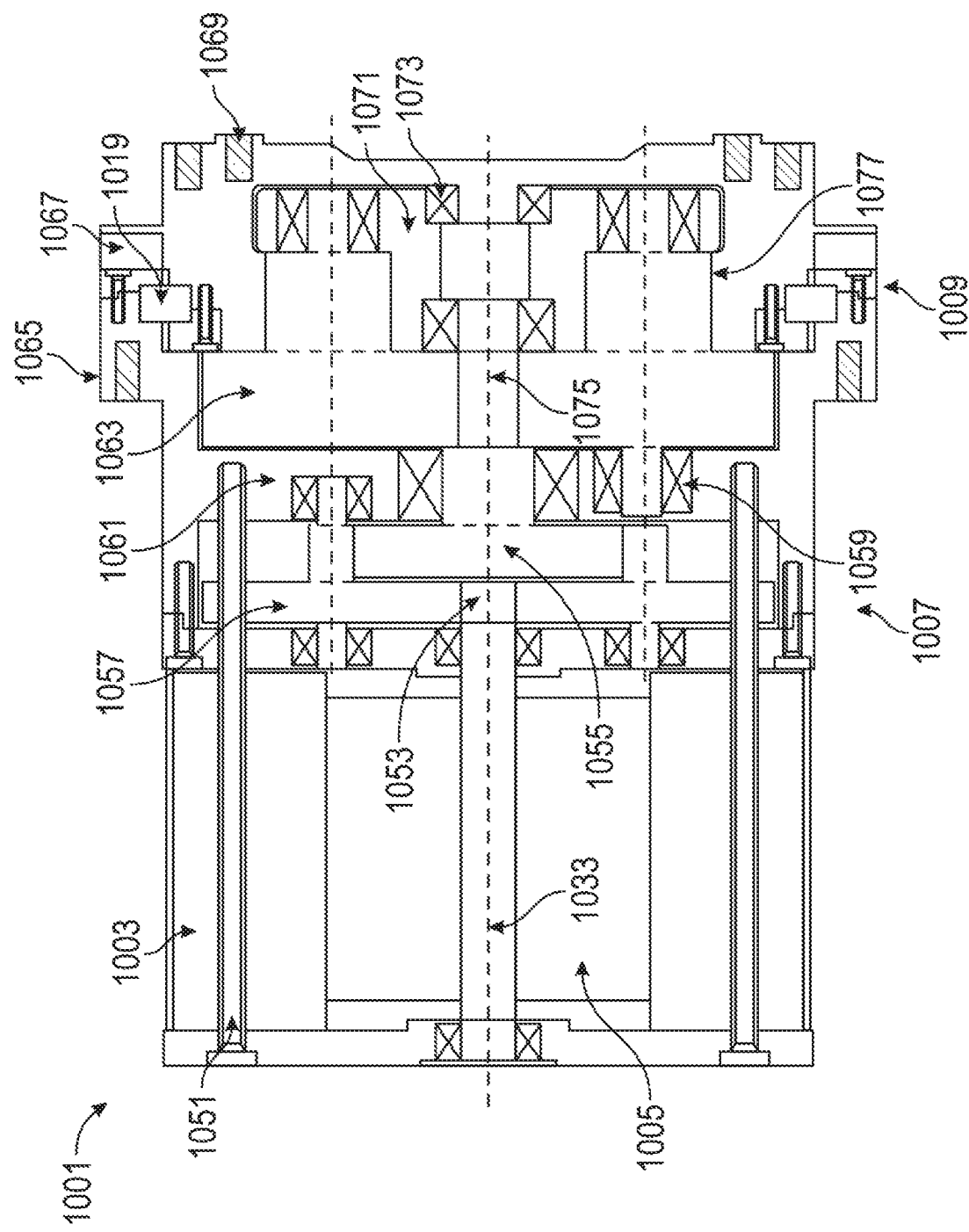
FIG. 7 is a schematic illustration of an actuator in accordance with the teachings herein that has a coffee can configuration and that utilizes a two-stage transmission based on star compound gear trains.

FIG. 7 depicts a particular, non-limiting embodiment of an actuator equipped with a two-stage compound gear train (in a so-called coffee can configuration) of a type which may be utilized in a power tool in accordance with the teachings herein. The actuator 1001 depicted therein comprises a stator 1003, a rotor 1005, a first stage gear train 1007, a second stage gear train 1009, a principal bearing 1019, a motor attachment bolt 1051, a first stage input pinion 1053, a first stage output 1055, a first stage amplifier gear 1057, an amplifier gear bearing 1059, a backbone structure 1061, a second stage amplifier gear 1063, a shell attachment 1065, a seal 1067, an output attachment plate 1069, a bearing cage 1071, an output support bearing 1073, a second stage input pinion 1075, and a circular arc gear mesh 1077.

As seen in FIG. 5, the final output star gears in the power tool depicted therein drive a large diameter internal output gear supported by a very rugged principal bearing in a very short force path (between the shell and the output force structure). This feature provides exceptional shock resistance (ruggedness) for applied output forces/moments in all directions. Also, these small diameter output star gears mesh with a large diameter internal gear to provide a large reduction ratio (up to 7-to-1) at the final high force stage of the gear module. This means that the earlier stages may have ratios of 0.5 up to 3-to-1 and may be lightly loaded at higher speeds (that is, the gearing may be smaller to save space and weight).

All star gears/shafts in the embodiment of FIG. 5 are supported by bearings at each end of the star shafts in stationary stiff strong back walls tied to the cylindrical shell. These structures may further benefit from design for manufacture (strong back wall ribbing, shell ribbing, sintered gearing) for further weight and cost reduction. The simple dog-leg clutches may be driven by grooves in an outer finger adjustment cylinder (or, 1 or 2 sliding latches) to drive "tangs" to the translating clutch cylinder at the central drive shaft. Finally, between the two switched star compounds is a pair of strong back walls separated by a further reducer (say 3-to-1) made up of three star gears to drive a gear on the central output shaft to the second switched module.

The front star compound is preferably very lightly loaded so the gears and clutch can be quite thin (reduced volume and weight). Each of four gears on the central shaft may be connected by the central splined clutch cylinder to drive its mating star gear. The other unconnected drive gear may free-wheel on the central shaft on needle bearings. Preferably, these central (sun) driving gears are of the smallest possible diameter to reduce the diameter of the outer shell, thereby reducing overall volume and weight.

The first requirement for a multi-speed transmission is to determine the appropriate gear ratios for each of the operating speeds. For the 2-speed transmission, the following switchable gear radii are available:

$r_1$—input sun gear (1)
$r_2$—output star gear (3)
$r_3$—input sun gear (1)
$r_4$—output star gear (3)

These radii preferably conform to the parallel constraint of the central and star shafts, so that:

$$r_1 + r_2 = r_3 + r_4$$

Suppose the ratio for gear set 1 is:

$$R_1 = \frac{r_2}{r_1} = 1$$

and that for gear set 2 is:

$$R_2 = \frac{r_4}{r_3} = 4$$

with the actual gear values:
$r_3=0.4r_1$; $r_4=1.6r_1$
Here, choosing $r_1=1$ simply chooses the scale of the gear train subsystem. The reduction ratio at the internal gear is taken as 7 to give the total speed ratios of:
$\overline{R}_1=7R_1=7$, $\overline{R}_2=7R_2=28$.
Given a motor speed of 8400 RPM, the available speed ranges are:
$\Delta\omega_1 \Rightarrow 0$ to 1200 RPM High Speed
$\Delta\omega_2 \Rightarrow 0$ to 300 RPM Low Speed
which is quite reasonable for a standard tool for everyday use.
For the four-speed tool transmission (see FIG. 5), we choose the following reduction ratios:
$R_1=0.4$, $R_2=2.5$, $R_3=0.5$, $R_4=2.0$
such that:

$$\overline{R}_1 = 0.4 \times 3 \times 0.5 \times 6 = 3.6$$

$$\overline{R}_2 = 0.4 \times 3 \times 2.0 \times 6 = 14.4$$

$$\overline{R}_3 = 2.5 \times 3 \times 0.5 \times 6 = 22.5$$

$$\overline{R}_4 = 2.5 \times 3 \times 2.0 \times 6 = 90.0$$

where the intermediate reducer is 3.0-to-1 and the final reducer is 6-to-1.

The tabulation for various input speeds is shown in TABLE 1 below, which illustrates the versatility of this 4-speed system relative to the possible input speed ranges of the motor.

TABLE 1

| | | Output Parameters For Various Input Speeds | | | |
|---|---|---|---|---|---|
| Output Speed | Ratio (R) | Low 1 (10,000) | Low 2 (20,000) | High 1 (30,000) | High 2 (40,000) |
| Low 1 | 90.0 | 111 | 222 | 333 | 444 |
| Low 2 | 22.5 | 444 | 888 | 1333 | 1776 |
| High 1 | 14.4 | 694 | 1389 | 2082 | 2778 |
| High 2 | 3.6 | 2778 | 5556 | 8334 | 11,111 |

FIG. 5 also provides a suggested layout for the slip clutch between the 4-speed reducer and the tool chuck. This layout does not require a central shaft because the slip clutch may be attached at the outer diameter of the output plate attached to the principal bearing in a shortest force path configuration. This slip clutch may be somewhat shorter than those now in present tools and may, therefore, compensate for the somewhat shorter transmission used in the Black and Decker patent (U.S. Pat. No. 9,233,461 (Tomayko)).

In this arrangement, the principal bearing is held to the shell with a bolted clamp bracket. A cover plate has a bolt ring to clamp the bearing to the internal output gear and seal off the transmission from the slip clutch. An outer bracket is attached (or physically the same piece) to this cover plate to provide an internal spring adjustment screw thread. This thread is matched with an external thread on an intermediate cylinder to support an outer assembly bracket. This latter bracket holds a slip collar on an inner cylinder with threads to anchor the primary body of the chuck.

The spring may be a Smalley spring (large motion/force range) which resists torsional deformation. The front face of the Smalley spring preferably holds a wave form to match one on the back of the chuck cylinder to form a pressure sensitive racket. Given enough spring pressure, the slip collar will remain fixed without motion to resist a given level of torque required on the tool. In the case where the torque is too high, the slip collar (and wave form ratchet) allows relative rotation to protect the tool and the user from excessive torque. Of course, detailed analysis is required to size all the elements of this slip clutch, but initial indications suggest that it is more compact (shorter) and weighs less than present shop tool slip clutches with a minimum of complexity.

The low complexity actuators utilized in the power tools described herein offer notable simplicity of design, ruggedness, durability, and high survivability. As seen in FIG. 3, these actuators are built using the classic star compound gear train which are superior in many respects to the frequently used epicyclic gear train (lower inertia, fewer parts, higher efficiency, use of small diameter bearings, lower internal inertia forces, easier designs, etc.). This gear train may utilize standardized gear meshes throughout. It may also utilize small diameter bearings (for low rolling element velocities to reduce losses) in fixed housing supports. It may further utilize a shortest force path between the reference shell through a cross roller bearing to the output attachment plate to improve actuator stiffness (which means lower weight), reduce sensitivity to temperature and manufacturing tolerances, and minimize the number of bearings in the actuator.

Finally, in a preferred embodiment, the output internal gear may mesh with up to six star gears to provide exceptional load capacity. In some embodiments, the last gear mesh may utilize circular arc gear teeth to further improve load capacity, durability, and efficiency.

These transmissions may have ratios for one-stage from 5 to 1 up to 25 to 1, and for extremely compact two-stage arrangements, a gear reduction ratio from 50 to 1 up to 400 to 1 is feasible (see FIG. 7). These transmissions may represent the lowest cost alternative and may be standardized in a minimum set of actuators for a given application domain, as has been done for computer chips in their numerous application domains to reduce cost while increasing performance.

Epicyclic transmissions are widely used in demanding speed reduction/torque amplification power transfer applications. Their concentricity about a central shaft enables high power transfer with multiple planet gears in a rotating output cage in contact with an input sun gear and with a stationary internal gear in the shell of the module.

FIG. 8 is an exploded view of an epicyclic transmission. The front assembly is a stationary shell which holds the internal ring gear. The sun gear is driven by an up-front power source, and meshes with three or more planet gears. These planet gears are held in a cage which rotates on bearings held on a centerline frame. Usually, the output of the transmission is a central shaft attached to the cage and supported by a bearing on the centerline frame.

Typically, the planet gears are assembled on cross shafts in the cage (usually press fitted) riding on rolling element bearings (frequently needle bearings). This cage module then accepts a front-end sun gear supported by a shaft bearing (between the power source and the sun gear). The cage, then, has an output shaft supported by a bearing held in a frame attached to the output "device" being driven by the transmission. Generally, this bearing can resist radial loads (maintain concentricity), but it is not suited to carry out-of-plane moment loads as found, for example, in industrial robot manipulators. Usually, all gears are helical gears to enable higher load capacity.

The planet cage must rotate at relatively high speeds (say, ¼ that of the input sun gear which can easily reach 5000 to 10,000 RPM). This cage must be relatively rugged to carry all the bearing forces from the planets (very high due to high centrifugal acceleration) and the output shaft gear. This means that it is relatively heavy and represents considerable inertia to reduce rapid response to command. It is best to first think of the cage and planets as a rigid mass that must be accelerated. Then, each gear must also be accelerated to an angular speed of up to 50% of the sun gear RPM. Hence, epicyclic gear trains, although widely used, are actually one of the worst reducer modules available for precision responsive systems.

Because the cage is supported only by central shaft bearings, it may experience deflection due to shock loads (from all directions). The cage is relatively heavy, such that a relatively small shock can generate significant deformation. This reduces its overall ruggedness. Moreover, since the moving cage structure and numerous bearings operate under radial load, there is a lack of throughput stiffness. Given the high inertia mass M and the low stiffness K, the equivalent natural frequency ($\omega_n = \sqrt{K/M}$) is low. For precision control and response to command, $\omega_n$ must be as high as possible. This is especially true of today's intelligent systems (robotics, surgery, all-wheel drive vehicles, construction machinery, etc.) which are increasingly highly nonlinear and coupled. This needed response to command is due to higher levels of computer control (AI, autonomy, sensor-based decisions, etc.) and human oversight and command. It is indeed unfortunate that one of the most important components (the intelligent actuator) is almost always built on the parameters of the weakest gear train—the epicyclic gear train.

As previously noted, the Black and Decker power tool transmission uses a series of compact and sophisticated epicyclic gears to obtain a 4-speed configuration in a very compact module (U.S. Pat. No. 9,233,461 (Tomayko)). The unique and different star compound gear-based transmissions disclosed herein provide an attractive alternative to the Black and Decker power tool transmission, and include 2-speed and a 4-speed configurations. TABLE 2 below compares the two foregoing transmissions, where it is seen that use of the star compound transmission results in a factored benefit of almost 60× over the epicyclic transmission currently utilized by Black and Decker.

TABLE 2

Comparison of Transmissions based on Epicyclic and Star Compound Gear Trains

| Criteria | Description | Benefit |
| --- | --- | --- |
| Minimize Inertia | Epicyclics (E) carry heavy rotating cages, translating and rotating gears which experience exceptionally high centrifugal forces on their bearings, while the star compound (SC) carries only rotating gears on stationary low velocity bearings. | 2.0 |
| Stiffness | The SC uses a shortest force path between the frame and the output to dramatically improve stiffness and ruggedness against shock. | 1.75 |
| Number of Gears | The SC has a few more gears to improve design choices and structural integrity, which adds some cost. | 0.7 |
| Machine Joint | Shortest force path through the principal bearing in the SC enables it to resist forces in all directions in a smaller volume. | 1.5 |
| Deformation | The SC has all shaft/gear bearings in stationary strong back walls to dramatically reduce deformation. | 2.5 |
| Clutches | The SC only needs 2 clutches to obtain four speed choices while the E requires four clutches. | 2.0 |
| Weight and Volume | The SC combination of fixed bearings and shortest force path increases torque density (i.e., lower weight). | 1.5 |
| Helical Gears | The SC bearing structure enables the effective use of helical gears to increase torque capacity by at least 2x. | 2.0 |
| Tool Length | The SC principal bearing rigid output structure enables a tool slip clutch 50% shorter and 50% less in weight. | 1.5 |
| Gear Module Length | The SC uses one more strong back wall and the clutches use up more length to increase the overall gear module length by 30%. | 0.7 |
| | Factored Benefit | 57.8 |

In a preferred embodiment of the star compound transmission described herein, all components are balanced and concentric with the central axis (centerline) so that no destructive out-of-plane moments are generated that would demand additional provisions such as, for example, high structural integrity, larger bearings, and a larger weight/volume. Typically, mechanical engineers faced with these design objectives turn to the epicyclic gear train, which meets all of these goals. Unfortunately, as noted above, the epicyclic gear train uses planet gears that are held in a rotating cage of very high weight, inertia, and large centrifugal forces on the planet bearings. The planets mesh with a fixed shell internal gear to return the torque to a small diameter gear tied to the output shaft. This arrangement leads to high gear tooth contact forces, high deformation, high sliding friction, more backlash, a greater potential for wear, and various other drawbacks. Moreover, the epicyclic transmission does not provide a useful location for an essential clutch for speed ratio changes.

The star compound transmission disclosed herein offers several advantages over the epicyclic transmission. At a superficial level, the star compound transmission resembles the epicyclic transmission. However, in the star compound transmission, all of the star gears (that look like planet gears) have fixed axes in small diameter, low velocity bearings which experience very low radial loads. Moreover, all of the star gear bearings are supported in strong back walls (as disks to rigidly support the drive's cylindrical walls). These strong back walls make the drive exceptionally rugged and resistant to shock. All forces are concentric about the central shaft. All inertia content in the star compound transmission is much lower in comparison to the epicyclic transmission (perhaps 5×), which permits high responsiveness to command.

The gears, bearings, shafts, and other components of the star compound transmission are standard components that may be mass produced at low cost. The shell/strong back walls protect the transmission from shocks in all directions. The BLDC stator reinforces this ruggedness. The clutch is exceptionally small, durable, and responsive. The BLDC can stay in its sweet spot for maximum efficiency because of flexible configuration management (hundreds of alternate distinct configurations) at the system level. Overall, it represents a very high performance/cost ratio, especially if it is mass produced in minimum sets (based, for example, on different power configurations).

Figure 9:
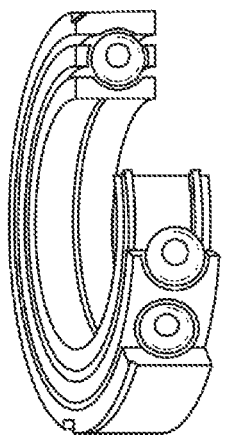
FIG. 9 is an illustration of some particular, non-limiting embodiments of bearing assemblies that may be utilized in the devices disclosed herein.
Figure 9:
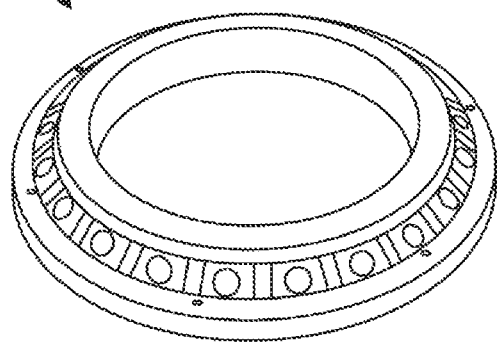
Figure 9:
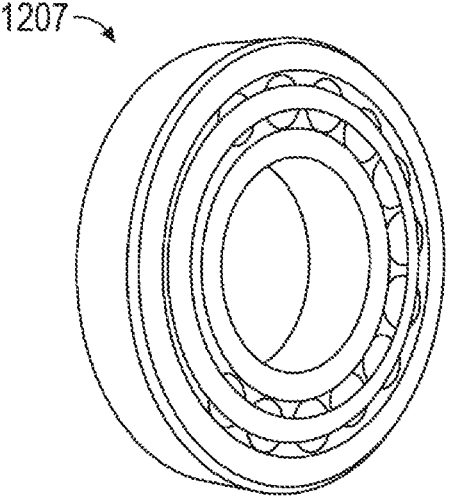

In a preferred embodiment, the star compound transmission utilized in the power tools described herein uses a nano dog leg clutch to switch the speed ratios. Strong, low velocity bearings in stationary housings may be used throughout. The principal output bearing can either be a crossed-roller bearing (CRB) 1205 (see FIG. 9), the exceptional (and lower cost) grooved roller bearing (GRB) 1207, or a simple 4-point ball bearing 1203.

The output ring supported by the rugged principal bearing can effectively resist forces in all directions because of its large diameter (many rolling elements) and rugged attachment structure. The output ring allows the star compound transmission to be produced as plug-in modules, thus allowing it to be readily incorporated into the highly modular tool designs that have become common in the industry. These modules may be built in minimum sets to enhance performance-to-cost ratios and left as a full choice (performance and cost) to the manufacturer or customer.

Preferred embodiments of the systems and devices described herein have numerous advantages over comparable prior art systems and devices based on epicyclic gearing. For example, the preferred embodiment of these systems and devices utilize a principal bearing, the location of which puts the output chuck support at the furthest point from the centerline of the transmission. This arrangement maximizes structural ruggedness, while reducing weight. The choice of bearing type for the principal bearing may be dictated by, for example, cost, performance and expected lifetime considerations. However, the principal bearing may be a four-point contact ball bearing, a crossed-roller bearing, or a grooved roller bearing.

Figure 1:
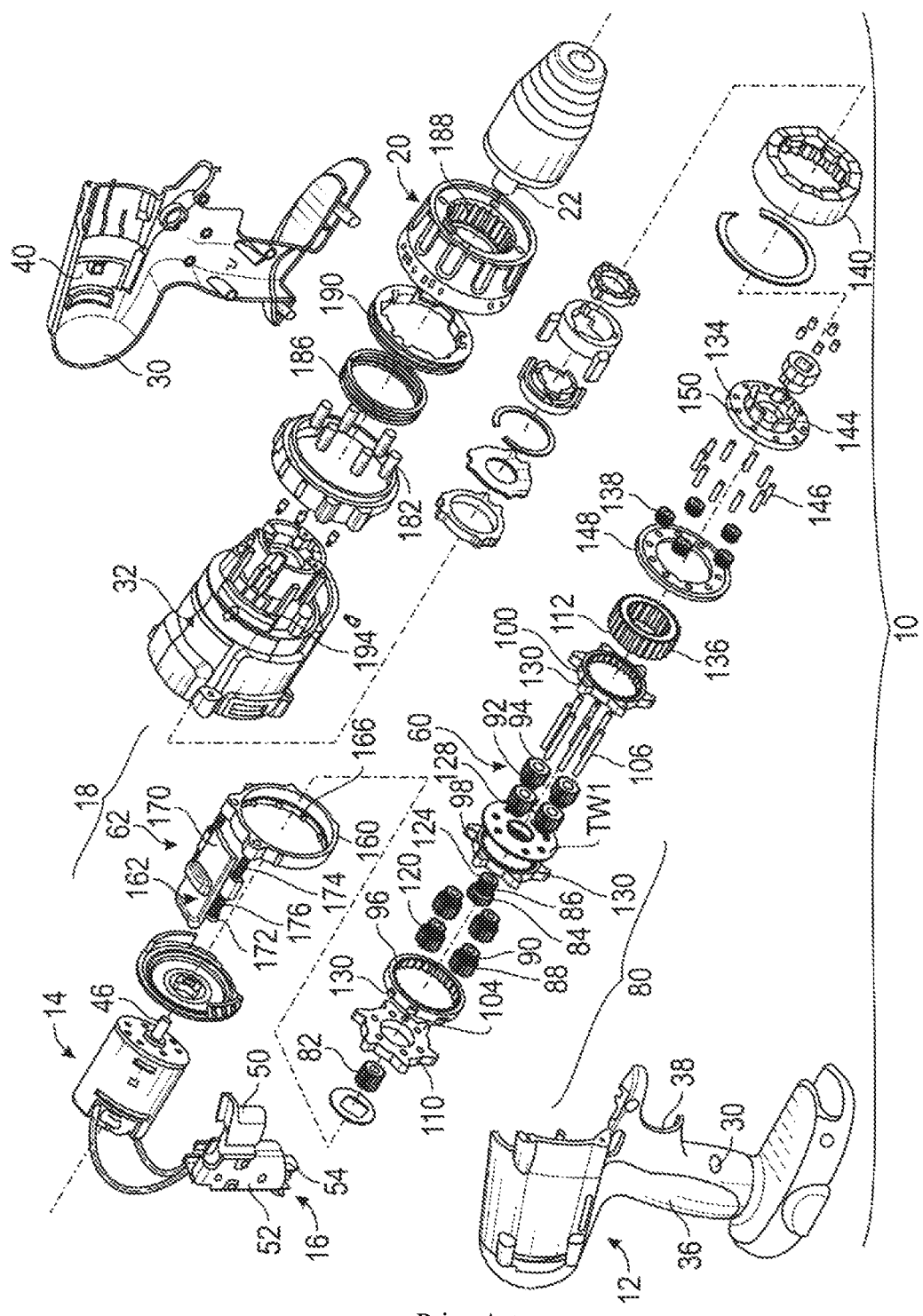
FIG. 1 is an exploded view of a power drill disclosed in U.S. Pat. No. 9,233,461 (Tomayko).
Figure 2:
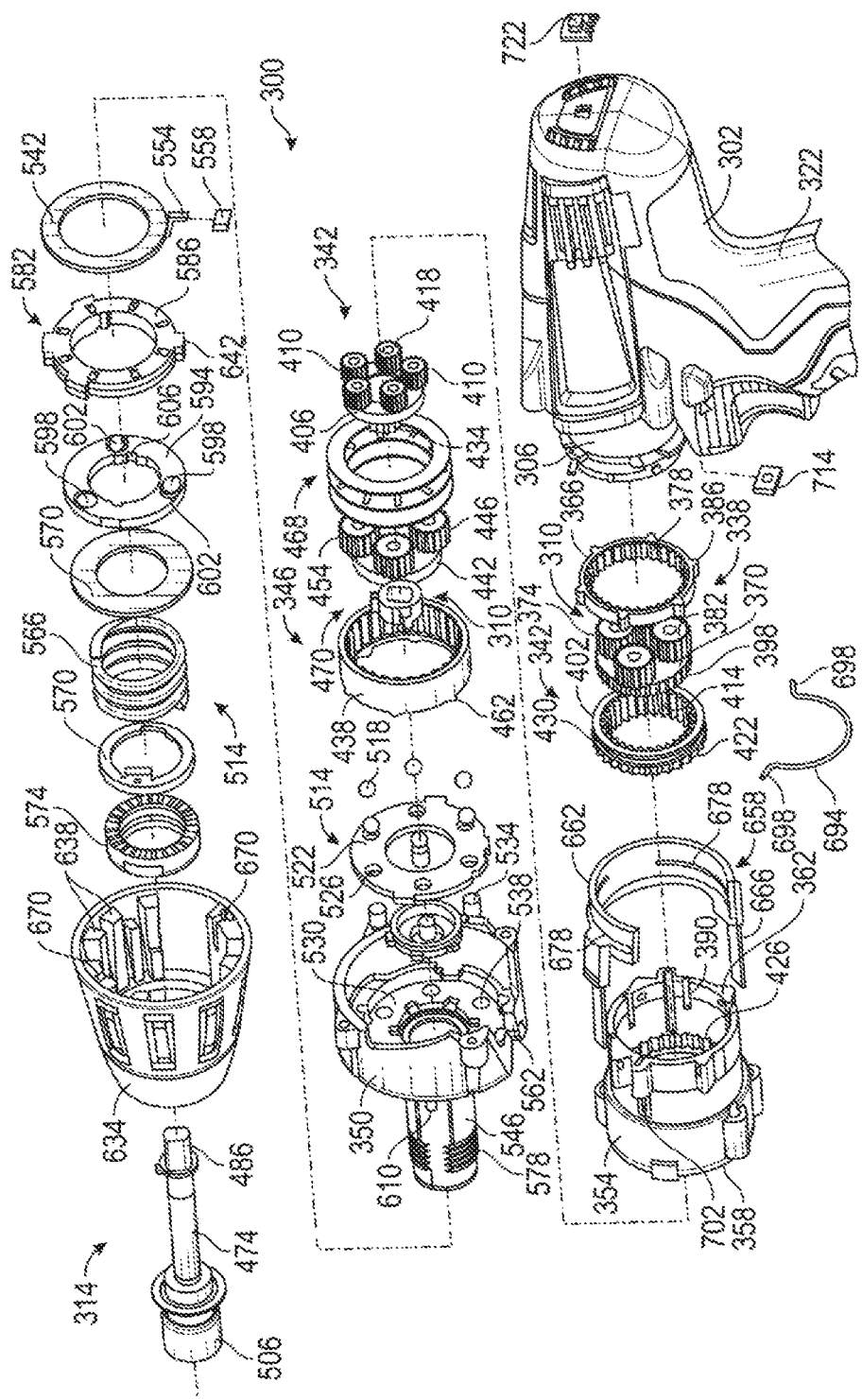
FIG. 2 is an exploded view of a power drill disclosed in U.S. 2011/0127059 (Limberg et al.).

The foregoing may be appreciated with respect to the shaft 22 in FIG. 1. This shaft has a small diameter, and drives the chuck which experiences very high torque and bending due to forces acting on the chuck. By contrast, preferred embodiments of the star compound gear train disclosed herein have a principal bearing whose inner race supports the chuck with a large ring diameter. Thus, for example, if the eccentric parallel shaft was 0.5 inches in diameter, the inner race of the principal bearing might have an inner diameter of 2.75 inches, and an outer diameter of 3.5 inches. The eccentric parallel shaft might be 1.0 inches long, while the bearing of the star compound gear might be 0.5 inches long. Rotational stiffness is a significant feature of the principal bearing in star compound gear reducers. In particular, the star compound gear train has an output with a rotational stiffness that is 2932 times greater than the output of the eccentric parallel gear.

Moreover, the use of a star compound gear train allows the use of a short, large diameter chuck to match the large diameter principal bearing with almost no deformation between the two. By contrast, an epicyclic parallel eccentric gear train of the type shown in FIG. 1 requires the use of a small diameter shaft to drive the chuck. This, in turn, requires the chuck to be smaller in diameter and longer in order to create a reasonable clamping force.

Preferred embodiments of the systems and devices described herein also provide exceptional shock resistance as a result of the configuration of preferred embodiments of the star compound gear train. In particular, preferred embodiments of the star compound gear train feature four strong walls (arranged in succession from the motor to a relatively large diameter output shaft), which cross over to stiffen the shell. This arrangement imparts exceptional rigidity to the shell and shock resistance, while also supporting all bearings in a rigid stationary structure. By contrast, typical implementations of the epicyclic gearing commonly used in shop tools feature multiple rigid, rotating cages in series which are supported by small bearings disposed on a small diameter central shaft.

Preferred embodiments of the systems and devices described herein also feature an advantageous clutch design which is characterized by higher stiffness, lower inertia and a smaller overall footprint as compared to clutches utilized in conventional epicyclic gear trains. In particular, the clutch in the star compound gear train of preferred embodiments of the systems and devices described herein utilizes simple, rugged, small diameter face gears which are manually moved from one face gear to another on a central shaft spline that is driven by a 3-position latch solenoid. Moreover, the dog leg clutches of the systems and devices described herein may be implemented as low cost, simple speed change devices of very low weight, small diameter and high stiffness. By contrast, conventional epicyclic gear trains of the type depicted in FIG. 1 feature a splined outer diameter clutch ring (with an internal gear) to shift from one epicyclic to another. These clutches have a larger diameter, higher inertia, lower stiffness, and greater mass than the dog leg clutches disclosed herein.

For example, in a conventional epicyclic gear train featuring 3 epicyclic gears, one of these gears typically allows rotation of a cage while the others are fixed to provide 3 distinct speeds. These clutches are large in diameter and must be free to slide horizontally. Consequently, they provide little structural integrity. By contrast, the dog leg face gear clutches utilized in preferred embodiments of the systems and devices disclosed herein are attached directly to gears on the central shaft and are supported by up to four strong back walls. The small diameter of these clutches imparts high stiffness and very low inertia to the gear train.

Preferred embodiments of the systems and devices described herein are also advantageous in that they effectively utilize a friction clutch to prevent high shock overloads. The tool depicted in FIG. 1 attempts to achieve this end through the use of a wave spring 186 and a set of friction surfaces 190. Spring force adjustment is achieved with collar 20 and spring 188.

By contrast, as seen in FIG. 5, this objective is achieved through the use of a large diameter slip collar 949 and chuck thread 951 with a parallel spring adjustment thread 945. These are unusually compact. Notably, the friction plates, wave spring, and wave surface may be fully utilized faces with very simple wave surfaces, and hence are much more reliable over long periods of usage.

The above description of the present invention is illustrative, and is not intended to be limiting. It will thus be appreciated that various additions, substitutions and modifications may be made to the above described embodiments without departing from the scope of the present invention. Accordingly, the scope of the present invention should be construed in reference to the appended claims. It will also be appreciated that the various features set forth in the claims may be presented in various combinations and sub-combinations in future claims without departing from the scope of the invention. In particular, the present disclosure expressly contemplates any such combination or sub-combination that is not known to the prior art, as if such combinations or sub-combinations were expressly written out.

What is claimed is:

1. A power tool, comprising:
a housing assembly;
a motor assembly disposed in the housing assembly and having an output shaft;
a trigger assembly coupled to the housing assembly and configured for use in actuating the motor assembly;
a spindle; and
a transmission assembly transmitting rotary power between the motor assembly and the spindle, the transmission assembly comprising a star compound gear train;
wherein said transmission assembly comprises a first set of star compound gears;
wherein said transmission assembly further comprises a set of output star gears;
wherein said transmission assembly further comprises an output gear; and
wherein said set of output star gears meshes with said output gear.

2. The power tool of claim 1, wherein said transmission assembly comprises a first stage equipped with a first set of star compound gears, and a second stage equipped with a second set of star compound gears.

3. The power tool of claim 2, wherein said first stage further comprises a first and second stage and a first clutch, and wherein said second stage further comprises a second clutch.

4. The power tool of claim 2, wherein each member of said first set of star compound gears comprises a plurality of gears concentrically disposed on a common shaft.

5. The power tool of claim 4, further comprising a second set of star compound gears, and wherein each member of said second set of star compound gears comprises a plurality of gears concentrically disposed on a common shaft.

6. The power tool of claim 5, further comprising first and second walls, wherein each member of said first set of star compound gears is supported by said first and second walls.

7. The power tool of claim 6, wherein said first and second walls are disks.

8. The power tool of claim 6, further comprising a second set of star compound gears and third and fourth walls, wherein each member of said second set of star compound gears is supported by said third and fourth walls.

9. The power tool of claim 8, wherein said third and fourth walls are disks.

10. The power tool of claim 8, wherein said transmission assembly comprises at least one clutch that switches the transmission between first and second speed regimes.

11. The power tool of claim 8, wherein said transmission assembly comprises at least one clutch that switches the star compound transmission between first, second, third and fourth speed regimes.

12. The power tool of claim 4, further comprising a second set of star compound gears, and wherein each member of said second set of star compound gears comprises a plurality of gears concentrically disposed on a common, stationary shaft.

13. The power tool of claim 2, wherein each member of said first set of star compound gears comprises a plurality of gears concentrically disposed on a common, stationary shaft.

14. The power tool of claim 1, wherein the power tool is a drill.

15. The power tool of claim 1, wherein said motor assembly drives said transmission assembly, and wherein said transmission assembly drives said spindle.

16. A power tool, comprising:
a housing assembly;
a motor assembly disposed in the housing assembly and having an output shaft;
a trigger assembly coupled to the housing assembly and configured for use in actuating the motor assembly;
a spindle; and
a transmission assembly transmitting rotary power between the motor assembly and the spindle, the transmission assembly comprising a star compound gear train;
wherein said transmission assembly comprises a first set of star compound gears;
wherein said first stage further comprises a first and second stage and a first clutch; and
wherein said second stage further comprises a second clutch.

17. The power tool of claim 16, wherein said transmission assembly further comprises a set of output star gears, and wherein said transmission assembly further comprises an output gear that meshes with said set of output star gears.

18. The power tool of claim 16, wherein said transmission assembly comprises a first stage equipped with a first set of star compound gears, and a second stage equipped with a second set of star compound gears, wherein said first stage further comprises a first and second stage and a first clutch, and wherein said second stage further comprises a second clutch.

19. The power tool of claim 18, wherein each member of said first set of star compound gears comprises a plurality of gears concentrically disposed on a common shaft, and wherein each member of said second set of star compound gears comprises a plurality of gears concentrically disposed on a common shaft.

20. The power tool of claim 16, further comprising first and second walls, wherein each member of said first set of star compound gears is supported by said first and second walls.

* * * * *